March 13, 1951  S. FEARNS  2,545,151
GEAR HOBBING MACHINE
Filed Jan. 18, 1947
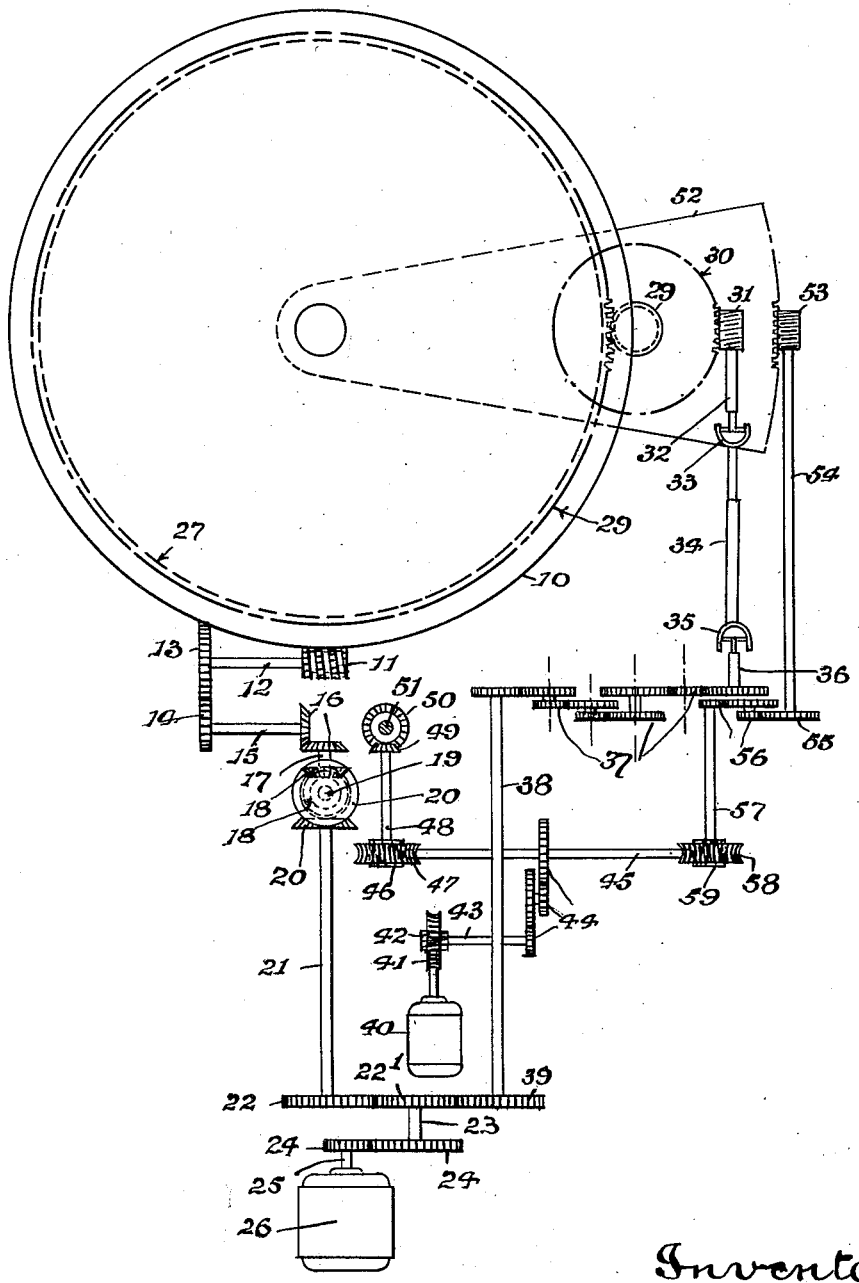
Inventor
Stanley Fearns Patented Mar. 13, 1951

2,545,151

UNITED STATES PATENT OFFICE 2,545,151

GEAR-HOBBING MACHINE

Stanley Fearns, Huddersfield, England, assignor to David Brown & Sons (Huddersfield), Limited, Huddersfield, England Application January 18, 1947, Serial No. 722,861
In Great Britain January 24, 1946

2 Claims. (Cl. 90—4)

The invention relates to machines for hobbing or generating the teeth of helical gears.

It is usual to drive the rotary worktable of a machine of the kind referred to by providing it with a worm-wheel with which meshes, either directly or through intermediate gears, a driving worm, and it is known to give to this worm a slow rotation or "creep" round the axis of the worm-wheel whilst the cutting operation is in progress. This procedure causes the effects of errors in the worm-wheel, or table gear as it is termed, to be distributed around the work in helices instead of along axial lines.

It is necessary, when a "creep" motion is provided, to make provision whereby an additional rotation is given to the worm to compensate for its "creep" about the axis of the table gear, and it is usual to effect this by providing differential gearing in the drive by which the worm is rotated.

The present invention has for its object to provide "creep" mechanism for a machine, for hobbing or generating the teeth of helical gears, by means of which the use of differential gearing will be avoided.

In order that the invention may be understood I shall, in describing the same, make reference to the accompanying drawing which illustrates, in more or less diagrammatic form, the mechanism constituting the invention and its application to a gear-hobbing machine.

Referring to the drawing, 10 represents a wheel blank in which teeth are to be cut and 11 a hob for cutting the teeth.

The shaft 12 carrying the hob 11 is driven by gears 13 and 14, shaft 15, bevels 16, 16, shaft 17, bevels 18, 18, shaft 19, bevels 20, 20, shaft 21, gears 22, 22', shaft 23 and gears 24, 24, from the shaft 25 of a suitable electric motor 26.

A rotary work table 27 carrying the wheel blank 10 has associated with it a table gear 28 driven by gear 29, a worm wheel 30, worm 31, shaft 32, universal joint 33, shaft 34, universal joint 35, shaft 36, change gearing 37, shaft 38, and gear 39 from the gear 22', which, as above mentioned, receives its motion from the motor 26.

Any alteration in the speed of rotation of the hob 11 is thus accompanied by a corresponding variation in the rate of rotation of the worktable 27.

The usual feed motion for the hob saddle which, as it forms no part of the present invention is not shown, is taken, in the illustrated example, from a separate motor 40 through gears 41 and 42, shaft 43, change gearing 44, shaft 45, gears 46 and 47, shaft 48, gears 49 and 50 and shaft 51.

Alternatively, of course, the shaft 48 may be driven from the motor 26 which drives the hob 12 and the work-table 27.

The worm 31 from which the table gear 28 receives its motion, together with the worm wheel 30 and gear 29 intermediate said worm 31 and the table gear is carried by a cradle 52 pivotal about the axis of the worktable. The periphery of the cradle 52 is provided with gear teeth which are engaged by a worm 53 driven through shaft 54, gear 55, change gearing 56, shaft 57 and gears 58 and 59, from the same shaft 45 through which drive is led to the feed motion for the hob saddle. The result of the geared connection between the cradle 52 is that the combined effect of the hob feed and of the rotation of the work table, as influenced by the "creep" given to the table driving worm 31, gives the desired helix angle to the teeth of the work piece.

The rate of feed given to the hob saddle through the shaft 45 can be changed whilst work is in progress without danger to either the hob or the work, and any such change is accompanied by a corresponding or proportionate variation in the rate of "creep."

Having thus described my invention, what I claim as new and desire to secure by Letters Patent is:

1. In a gear hobbing machine, a hob and gearing intermediate same and a source of motion, a rotary work table, a worm through which rotary motion is conveyed to said worktable, a shaft carrying said worm, a change gearing, a universally-jointed connection between said shaft carrying said worm and said change gearing, a geared connection between said change gearing and a member of the gear train through which the hob is driven, a cradle pivotal about the axis of the worktable and carrying the worm through which rotary motion is conveyed to the worktable, gear teeth on said cradle, feed motion means for said hob, a driven shaft driving said feed motion means, and a worm meshing with the teeth on the cradle and driven through gearing from said driven shaft which also drives said feed motion means for the hob.

2. In a gear hobbing machine a hob; means for rotating said hob; a rotary work table; a worm through which rotary motion is conveyed to said work table; a shaft carrying said worm; driving means for rotating said shaft; a cradle pivotal about the axis of said work table and carrying said worm through which rotary motion is conveyed to said work table; gear teeth on said cradle; feed motion means for said hob; a driven shaft driving said feed motion means; a worm meshing with said gear teeth on said cradle; and a gearing driven also by said driven shaft and driving said worm meshing with said gear teeth on said cradle.

STANLEY FEARNS.

REFERENCES CITED

The following references are of record in the file of this patent:

UNITED STATES PATENTS

| Number | Name | Date |
| --- | --- | --- |
| 1,105,649 | Grundstein | Aug. 4, 1914 |
| 1,511,077 | Hodgkinson | Oct. 7, 1924 |
| 2,466,512 | Sykes et al. | Apr. 5, 1949 |

FOREIGN PATENTS

| Number | Country | Date |
| --- | --- | --- |
| 865,207 | France | Feb. 17, 1941 |